C. S. H. SNOW.
WHEEL FOR MOTOR ROAD AND OTHER VEHICLES.
APPLICATION FILED NOV. 2, 1920.
1,414,594.
Patented May 2, 1922.
2 SHEETS—SHEET 1.
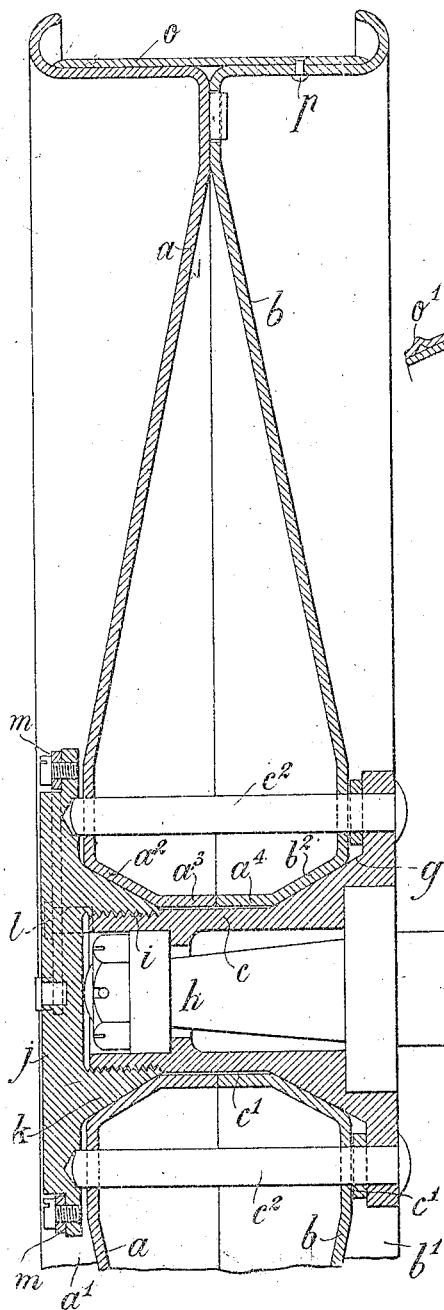
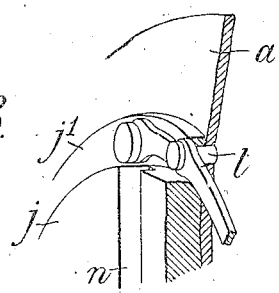
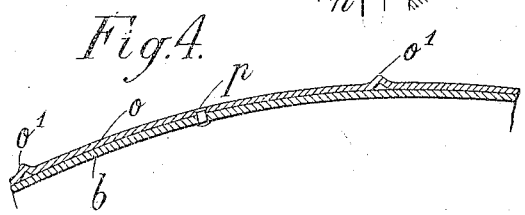
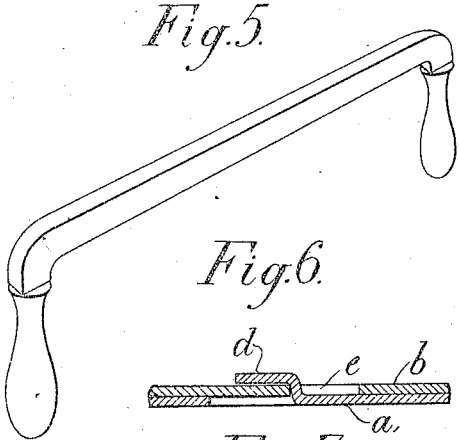
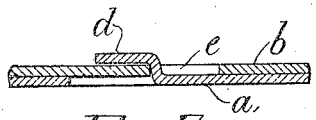
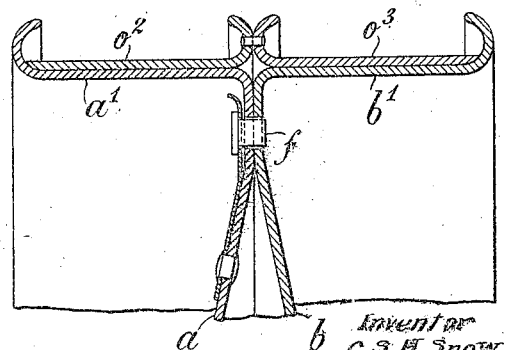

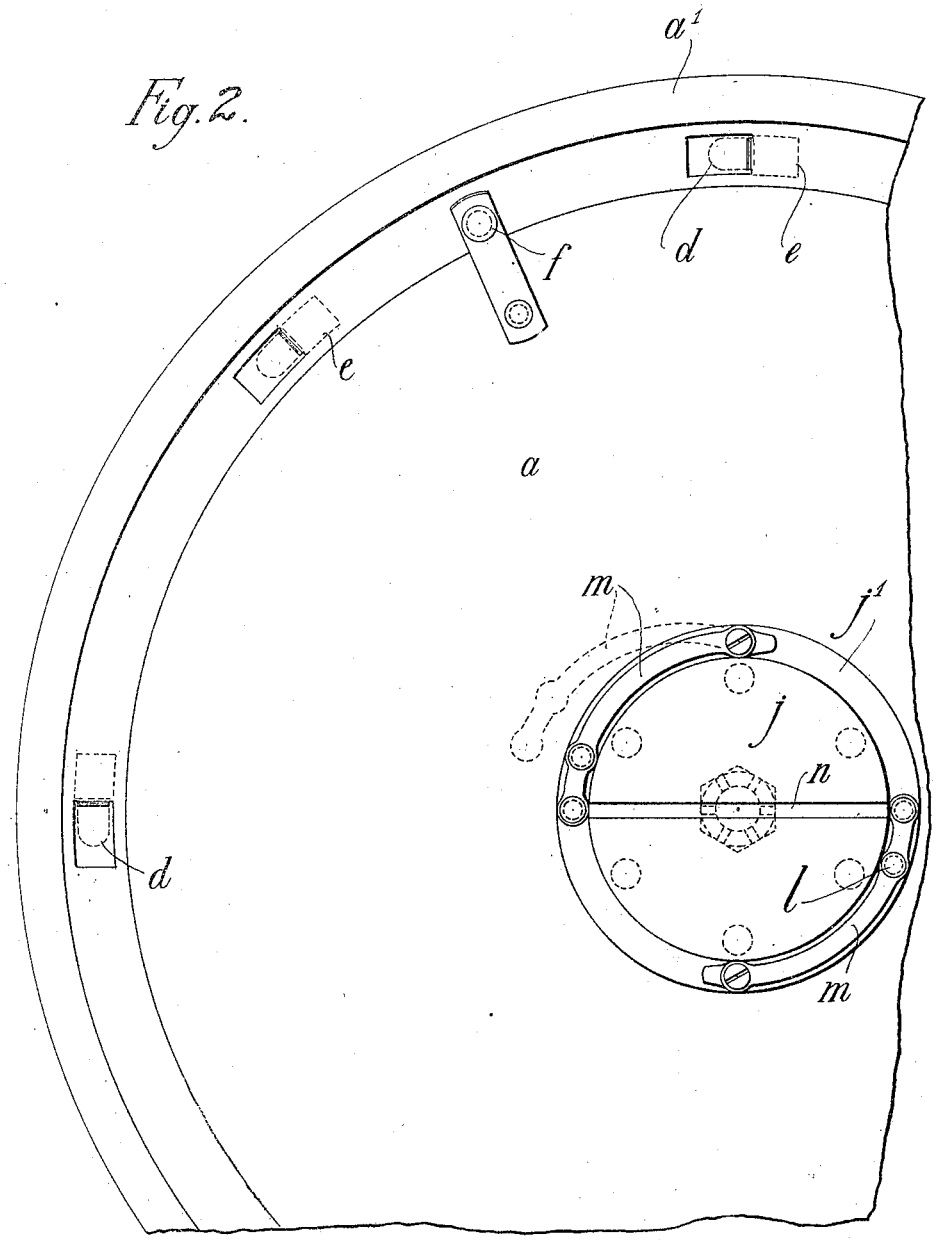

UNITED STATES PATENT OFFICE.

CHARLES STEWART HASTINGS SNOW, OF SOUTH HAMPSTEAD, LONDON, ENGLAND.

WHEEL FOR MOTOR ROAD AND OTHER VEHICLES.

1,414,594.　　　　　Specification of Letters Patent.　　Patented May 2, 1922.

Application filed November 2, 1920. Serial No. 421,323.

*To all whom it may concern:*

Be it known that I, CHARLES STEWART HASTINGS SNOW, a subject of His Majesty the King of England, and resident of South Hampstead, in the county of London, Kingdom of England, have invented certain new and useful Improvements in or Relating to Wheels for Motor Road and Other Vehicles, of which the following is a specification.

This invention refers to improvements in or relating to wheels for motor road and other vehicles.

According to the present invention I provide a wheel which is detachable as a whole from the central boss or stub axle and in which the inner rim section is detachable from the fixed portion and the wheel for the exchange or repair of the tyre. Other distinguishing features will be apparent from the following description.

The present invention is hereinafter described with reference to the accompanying drawings in which:—

Figure 1 is a fractional sectional elevation of the improved wheel;

Figure 2 is a fractional side elevation of said wheel;

Figure 3 is a perspective view of the boss of the wheel showing the fixing means;

Figure 4 is a longitudinal sectional view of the wheel rim and mounting band;

Figure 5 is a view of a tool suitable for removing and replacing the wheel;

Figure 6 is a detail view of the peripheral disc fixing means, and

Figure 7 is a sectional elevation of a rim for use with twin tyres.

As shown and in carrying the invention into effect, the improved wheel comprises a pair of plain conical discs $a$ $b$ of similar section which are removably secured to a central hub sleeve $c$ and to each other at their meeting edge or peripheries. These conical discs are preferably formed integrally with the fixed rim sections $a'$ $b'$ and the outer $a'$ of said removable rim section with its disc $a$ is adapted to be suitably secured to the edge of the inner conical disc $b$ and rim section $b'$ by means of a plurality of hook like stamped up proections $d$ which extend through a corresponding number of short circular slots $e$ formed in the disc $b$ provided with the rim section $b'$. Thus when the parts $a$ $a'$ and $b$ $b'$ are slightly turned in relation to each other the hook members $d$ can, as shown in Figures 1 and 2, be made to engage the face of the disc $b$ of the rim section $b'$ holding the same firmly in place. In order to prevent detachment or backward rotation of the parts I provide a spring pressed bolt or stud $f$ on the disc $a$ near the wheel rim section $a'$ which is adapted to pass through corresponding holes in the rim section $a$ and $b$.

The hole through the outer hub sleeve formed by the inner portions $a^3$ $a^4$ of the discs $a$ $b$ is outwardly flared at its ends $a^2$ $b^2$ and adapted to engage a correspondingly formed conical surface $g$ on the central hub sleeve $c$ of the stub axle $h$. The outer end of this central hub sleeve $c$ is screw threaded as shown at $i$ and is adapted to engage a fixing nut or cap $j$ having an externally conical extension $k$ adapted to enter the outer flared end $a^2$ of the outer hub sleeve and to wedge it tightly home. Rotation may also be positively prevented and correct assembly ensured by the provision of driving pins $c^2$ in the flange of the sleeve $c$ which are adapted to pass through holes in the discs $a$ $b$ as shown. For preventing the working loose of the said nut $j$, it is provided on each side with a spring pressed pin $l$ which is mounted on a pivotally mounted arm $m$ and passes through a hole in a flanged portion $j'$ of the nut $j$ and into one of a series of holes formed in the outer conical disc $a$ beneath said flange. The middle portion $c'$ of the stub axle bearing sleeve $c$ is cut away so as to allow the wheel to be rocked slightly to facilitate its removal when the fixing nut or cap $j$ is removed. For removing the cap $j$ a tool such as that shown in Figure 5 may be employed for engagement with a diametrical slot $n$ cut across the head of the said cap. A knob on the arms $m$ normally comes opposite to the ends of the slot and so prevents the use of the tool until the pins $l$ are withdrawn and turned out of the way, as shown in dotted lines in Figure 3.

In order to facilitate the removal or replacement of the tyre a mounting band $o$ such as that shown in Figures 1 and 3 which is secured as by rivets $p$ to the one rim section $b'$ is preferably provided with upstanding projections conveniently in the form of transverse ribs $o'$ to prevent slipping or creeping of the tyre when in position and under load. In the case of a twin tyre as in Figure 6 the mounting band may be formed by uniting or riveting together two members $o^2$ $o^3$ each having a bead on its inner edge to conform to those on the rim sections $a'$ $b'$.

In some cases instead of employing the hereinbefore described means for securing the discs together by partial rotation I may use bolts and nuts serving to pull the discs laterally together or if preferred screw headed stud in one disc having an elongated head at its other or inner end which is adapted to pass through a corresponding elongated opening in the opposite disc. When so assembled the stud is adapted to be turned through 90° or other convenient angle by means of a screwdriver or other convenient tool and to thus firmly retain the parts in their engaged position. If desired the elongated head may cooperate with an inclined plane on the disc so as to draw the parts firmly together.

It will be appreciated that by the present invention I am enabled to provide a disc wheel with a removable rim section without the necessity of providing bolts or other fixing means on the face of the outer conical disc of the wheel.

What I claim is,

1. A detachable wheel having complementary disks, a series of pins passing through said discs for securing the discs together adjacent the hub of the wheel, mean for interlocking said disks at their outer edges, said disks beyond said interlocking means being projected laterally and curved to form a tire receiving rim section.

2. A detachable wheel having a hub sleeve formed to cooperate with the radially arranged wheel forming member, a hub cap adapted to overlie the inner edge of said member and having threaded connection with the sleeve said hub cap being formed to exert radial pressure on the wheel forming member in proportion to its threaded connection with the sleeve, and means for fixing the hub cap against movement relative to the sleeve.

3. A detachable wheel having a hub sleeve formed to cooperate with the radially arranged wheel forming member, a hub cap adapted to overlie the inner edge of and exert radial pressure on said member and having threaded connection with the sleeve, and means for fixing the hub cap against movement relative to the sleeve, said means passing through the hub sleeve and the wheel forming member and engaging the hub cap to fix the wheel forming member and sleeve with relation to each other.

In testimony whereof I have hereunto signed my name.

CHARLES STEWART HASTINGS SNOW.